US012745291B2

(12) United States Patent
Li et al.

(10) Patent No.: US 12,745,291 B2
(45) Date of Patent: Sep. 22, 2026

(54) METHOD FOR RANDOM ACCESS

(71) Applicant: Nokia Technologies Oy, Espoo (FI)

(72) Inventors: Zexian Li, Espoo (FI); Navin Hathiramani, Dallas, TX (US); Frank Frederiksen, Aalborg (DK); Juha Sakari Korhonen, Espoo (FI); Luis Guilherme Uzeda Garcia, Massy (FR)

(73) Assignee: Nokia Technologies Oy, Espoo (FI)

( * ) Notice: Subject to any disclaimer, the term of this patent is extended or adjusted under 35 U.S.C. 154(b) by 282 days.

(21) Appl. No.: 18/596,758

(22) Filed: Mar. 6, 2024

(65) Prior Publication Data

US 2024/0334496 A1 Oct. 3, 2024

(30) Foreign Application Priority Data

Mar. 29, 2023 (FI) .................................... 20235357

(51) Int. Cl.
*H04W 74/0836* (2024.01)
*H04W 76/20* (2018.01)
*H04W 76/40* (2018.01)

(52) U.S. Cl.
CPC ....... *H04W 74/0836* (2024.01); *H04W 76/20* (2018.02); *H04W 76/40* (2018.02)

(58) Field of Classification Search
CPC . H04W 74/0836; H04W 76/20; H04W 76/40; H04W 74/006; H04W 74/0833; H04W 74/002; H04W 74/08
See application file for complete search history.

(56) References Cited

U.S. PATENT DOCUMENTS

2018/0097672 A1 4/2018 Jung et al.
2020/0252973 A1 8/2020 Zhang et al.
2020/0314913 A1 10/2020 Rastegardoost et al.
2021/0298088 A1* 9/2021 Qi ......................... H04L 5/0051
2022/0053575 A1 2/2022 He et al.
2022/0191940 A1 6/2022 Molavianjazi et al.
2023/0388871 A1* 11/2023 Guo .................. H04W 36/0069

FOREIGN PATENT DOCUMENTS

WO 2017/036564 A1 3/2017
WO 2022/079014 A1 4/2022
WO 2022/167918 A1 8/2022
WO 2022/221984 A1 10/2022
WO 2022/232973 A1 11/2022
(Continued)

OTHER PUBLICATIONS

Extended European Search Report received for corresponding European Patent Application No. 24161300.9, dated Sep. 11, 2024, 8 pages.
(Continued)

*Primary Examiner* — Shawn D Miller
(74) *Attorney, Agent, or Firm* — Robert P. Michal, Esq.; Rimon PC

(57) ABSTRACT

A method comprising: receiving configurations for a plurality of entry points for initial random access from an access point; determining random access resources for one or more entry points; and initiating, based on one or more criteria relating to properties of the apparatus or a network, at least one random access process with at least one of said entry points.

1 Claim, 6 Drawing Sheets

(56) References Cited

FOREIGN PATENT DOCUMENTS

| | | | |
|---|---|---|---|
| WO | 2023/000306 | A1 | 1/2023 |
| WO | 2023/014761 | A1 | 2/2023 |
| WO | 2023/044025 | A1 | 3/2023 |

OTHER PUBLICATIONS

"3rd Generation Partnership Project Technical Specification Group Radio Access Network; NR; Physical channels and modulation (Release 17)", 3GPP TS 38.211, V17.3.0, Sep. 2022, pp. 1-136.

"3rd Generation Partnership Project; Technical Specification Group Radio Access Network; NR; Physical layer procedures for data (Release 17)", 3GPP TS 38.214, V17.3.0, Sep. 2022, pp. 1-233.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"Digital cellular telecommunications system (Phase 2+); Mobile radio interface layer 3 specification (GSM 04.08 version 8.0.0 Release 1999) Available SMG only", GSM 04.08, 8.0.0, Jul. 1999, pp. 1-17.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321, V17.2.0, Sep. 2022, pp. 1-146.

"Further consideration on RACH enhancements", 3GPP TSG RAN WG2#120, R2-2212285, Agenda item: 8.13.6, ZTE Corporation, Nov. 14-18, 2022, 7 pages.

Finnish Application No. 20235174, "Method For Random Access", filed on Feb. 16, 2023, pp. 1-34.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.3.0, Dec. 2022, pp. 1-1133.

Office Action received for corresponding Finnish Patent Application No. 20235357, dated Aug. 30, 2023, 9 pages.

* cited by examiner

METHOD FOR RANDOM ACCESS

TECHNICAL FIELD

The present invention relates to random access procedures.

BACKGROUND

The classical random access (RA) procedure is composed of multiple steps between a user equipment (UE) and an access point, such as a gNB, in order for the UE to acquire uplink (UL) synchronization and obtain resources for the following up communication. The random access procedure has multiple purposes, but the main purposes would be to either (a) make the gNB aware that the UE is in need of establishing connection, or (b) provide a signal from the UE to the gNB that allows the gNB to adjust/correct the UE's transmit timing.

In 5G new radio (NR), two random access procedures have been supported: 4-step and 2-step random access procedure. The 4-step contention based random access (CBRA) procedure comprises four messages (Msg1, Msg2, Msg3 and Msg4) transmitted between the UE and the gNB. For reducing the latency involved in 4-step RA procedure, a 2-step contention based random access (CBRA) procedure has been introduced. Therein, the RA preamble transmission on the PRACH (Msg1) and PUSCH (Msg3) are transmitted together, and this is called MsgA. Likewise, the RAR (Msg2) and the contention resolution (Msg4) are transmitted together, known as MsgB. Moreover, both 4-step RA procedure and 2-step RA procedure can be configured in contention free manner, i.e. contention free random access (CFRA).

Nevertheless, such RA procedures provide no possibilities for further considerations, for example, regarding the UE mobility status (e.g. high/low mobility or even static), the UE capabilities, the UE QoS requirements (e.g. premium user or ultra low latency users or normal users), etc. In addition, there is very little consideration from various deployment points of view. For example, in case with small cell deployment within a factory floor (~50 m), the inaccuracy of the timing advance (TA) might be neglectable. However, this cannot be considered upon the RACH procedure.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for receiving configurations for a plurality of entry points for initial random access from an access point; means for determining random access resources for one or more entry points; and means for initiating, based on one or more criteria relating to properties of the apparatus or a network, at least one random access process with at least one of said entry points.

According to an embodiment, one of the plurality of entry points is a primary entry point and one or more of the plurality of entry points are secondary entry points.

According to an embodiment, random access configuration for the primary entry point is determined from among most reliable available random access resources.

According to an embodiment, random access configuration for the one or more secondary entry points are determined based on one or more criteria relating to the properties of the apparatus or the network.

According to an embodiment, the apparatus comprises means for receiving the configurations for the plurality of entry points for initial random access in a broadcast message or in a multicast message.

According to an embodiment, the apparatus comprises means for receiving an indication about activation or deactivation of at least one secondary entry point.

According to an embodiment, said indication comprises a flag for each configured secondary entry point to indicate the activation or the deactivation.

According to an embodiment, the apparatus comprises means for carrying out only one random access process with only one of said entry points at a time.

According to an embodiment, the apparatus comprises means for carrying out multiple random access processes with one or more of said entry points simultaneously.

An apparatus according to a second aspect comprises at least one processor and at least one memory, said at least one memory stored with computer program code thereon, the at least one memory and the computer program code configured to, with the at least one processor, cause the apparatus at least to perform: receive configurations for a plurality of entry points for initial random access from an access point; determine random access resources for one or more entry points; and initiate, based on one or more criteria relating to properties of the apparatus or a network, at least one random access process with at least one of said entry points.

A method according to a third aspect comprises receiving configurations for a plurality of entry points for initial random access from an access point; determining random access resources for one or more entry points; and initiating, based on one or more criteria relating to properties of the apparatus or a network, at least one random access process with at least one of said entry points.

According to a fourth aspect, there is provided an apparatus comprising means for determining configurations for a plurality of entry points for initial random access for one or more user equipment; means for transmitting the configurations to the one or more user equipment; and means for performing at least one random access process with at least one user equipment using at least one of said entry points indicated by said user equipment.

According to an embodiment, one of the plurality of entry points is a primary entry point and one or more of the plurality of entry points are secondary entry points.

According to an embodiment, random access configuration for the primary entry point is determined from among most reliable available random access resources.

According to an embodiment, the apparatus comprises means for determining random access configuration for the one or more secondary entry points based on one or more criteria relating to the properties of the user equipment or a network.

An apparatus according to a fifth aspect comprises at least one processor and at least one memory, said at least one memory stored with computer program code thereon, the at least one memory and the computer program code configured to, with the at least one processor, cause the apparatus at least to perform: determine configurations for a plurality of entry points for initial random access for one or more user equipment; transmit the configurations to the one or more user equipment; and perform at least one random access process with at least one user equipment using at least one of said entry points indicated by said user equipment.

A method according a sixth aspect comprises: determining configurations for a plurality of entry points for initial random access for one or more user equipment; transmitting the configurations to the one or more user equipment; and performing at least one random access process with at least one user equipment using at least one of said entry points indicated by said user equipment.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out the random access procedure. While the following focuses on 5G networks, the embodiments as described further below are by no means limited to be implemented in said networks only, but they are applicable in any network supporting random access procedure.

Figure 1:
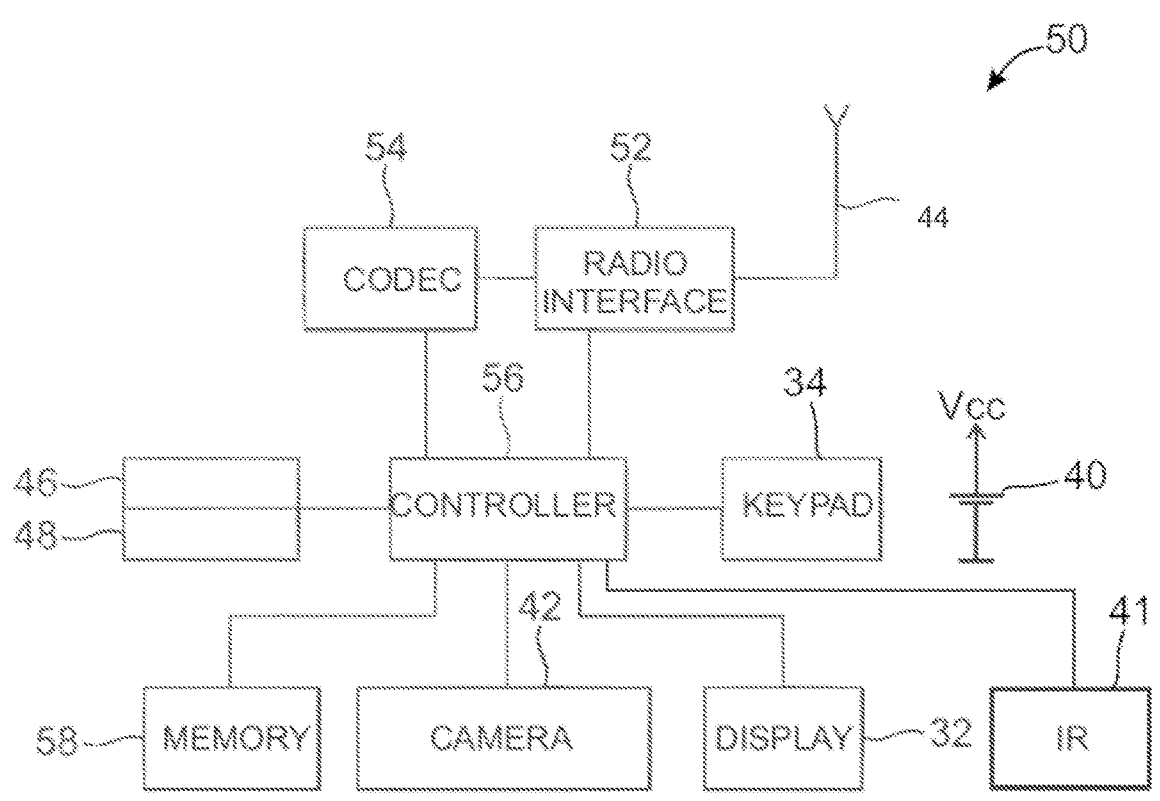
FIG. 1 shows a schematic block diagram of an apparatus for incorporating a random access arrangement according to the embodiments.
Figure 2:
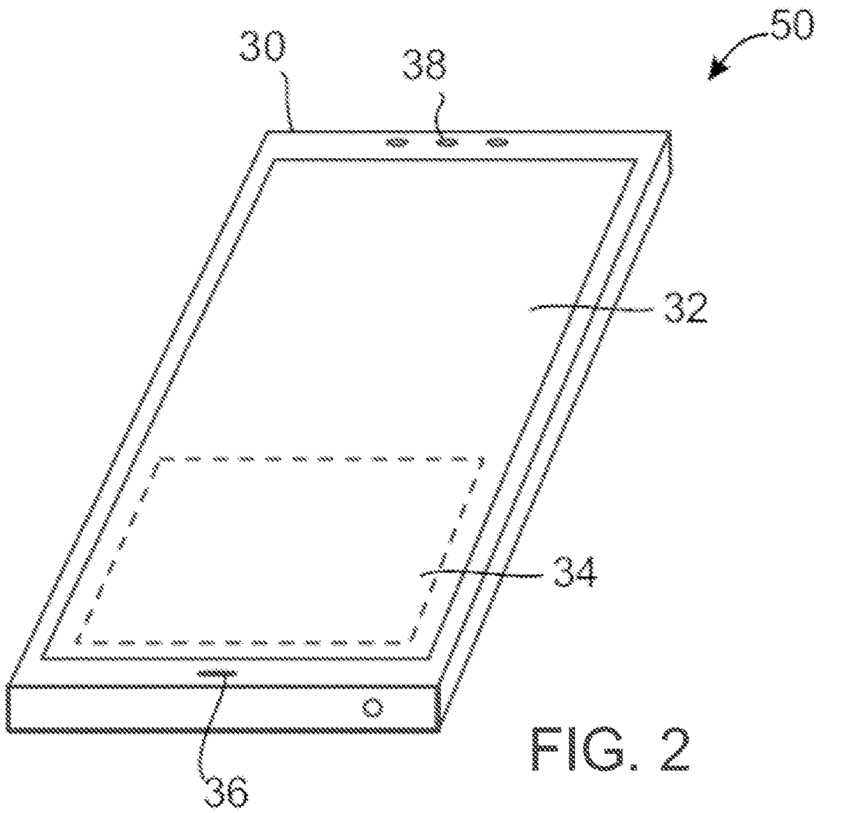
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
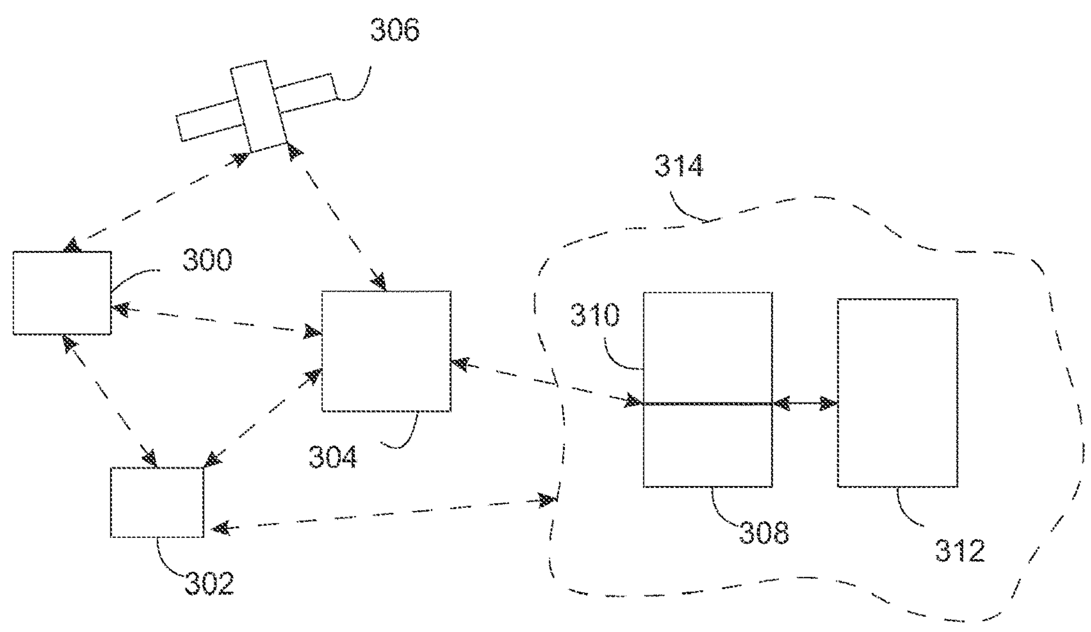
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (c/g) NodeB) 304 providing the cell. The physical link from a user device to a (c/g) NodeB is called uplink or reverse link and the physical link from the (c/g) NodeB to the user device is called downlink or forward link. It should be appreciated that (c/g) NodeBs or their functionalities may be implemented by using any node, host, server or access point etc. entity suitable for such a usage.

A communication system typically comprises more than one (c/g) NodeB in which case the (c/g) NodeBs may also be configured to communicate with one another over links, wired or wireless, designed for the purpose. These links may be used for signaling purposes. The (c/g) NodeB is a computing device configured to control the radio resources of communication system it is coupled to. The NodeB may also be referred to as a base station, an access point or any other type of interfacing device including a relay station capable of operating in a wireless environment. The (c/g) NodeB includes or is coupled to transceivers. From the transceivers of the (c/g) NodeB, a connection is provided to an antenna unit that establishes bi-directional radio links to user devices. The antenna unit may comprise a plurality of antennas or antenna elements. The (c/g) NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (c/g) NodeBs, the user device may have an access to a plurality of radio cells and the system may comprise also other apparatuses, such as physical layer relay nodes or other network elements, etc. At least one of the (c/g) NodeBs or may be a Home (c/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (c/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (c/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g)

Node Bs, includes, in addition to Home (c/g) NodeBs (H (c/g) nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

The classical random access (RA) procedure is composed of multiple steps between UE and gNB for the UE to acquire uplink (UL) synchronization and obtain resources for the following up communication. The random access procedure has multiple purposes, but the main purposes would be to either (a) make the gNB aware that the UE is in need of establishing connection, or (b) provide a signal from the UE to the gNB that allows the gNB to adjust/correct the UE's transmit timing.

The random access (RA) procedure may be carried out as network configured contention-free random access (CFRA) or contention-based random access (CBRA). The legacy CBRA procedure adopted from 4G/LTE to the 5G is called a 4-step RA procedure comprising four messages (Msg1, Msg2, Msg3 and Msg4).

Figure 4:
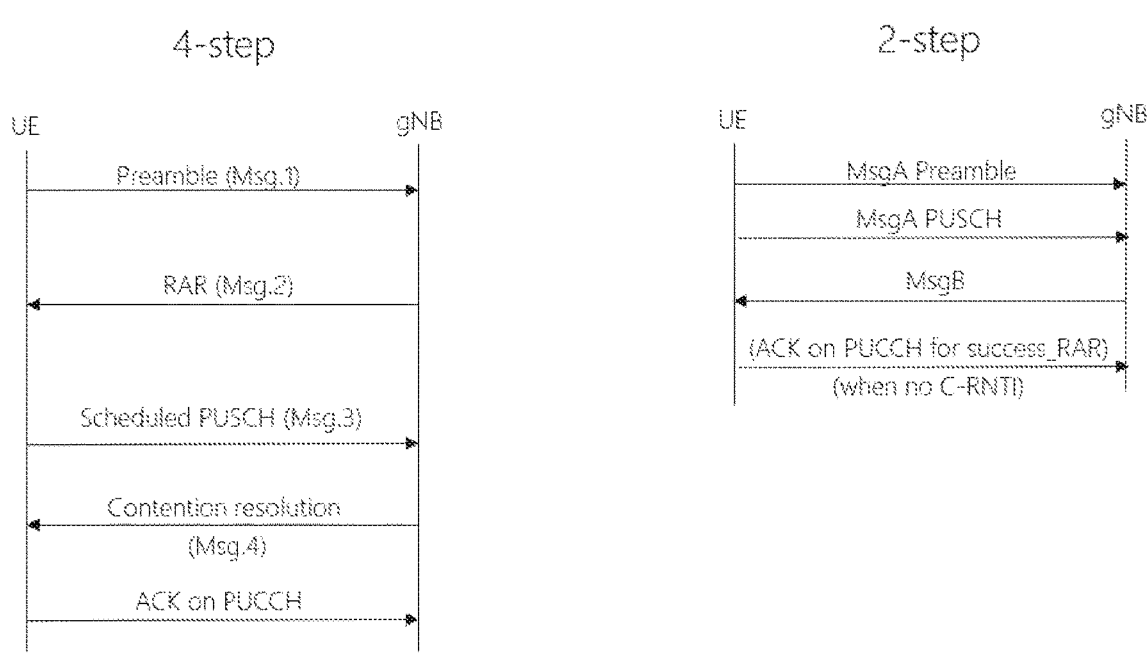
FIG. 4 shows examples of the 4-step CBRA procedure and the 2-step CBRA procedure.

In 4-step RA type CBRA, shown in FIG. 4, the UE randomly selects an RA preamble from a pool of preambles shared with other UEs in the cell and transmits the RA preamble to an access node, such as to gNB, as Msg1. The gNB provides a random-access response (RAR) known as Msg2, wherein the RAR comprises the uplink (UL) time/frequency resources the UE should use for its UL transmission. If multiple UEs transmit preambles in the same frequency and time resource selecting the same preamble sequence, all those UEs decode the same RA response content and transmit PUSCH on the same UL time/frequency resources, knowns as Msg3. The network resolves the contention and the contention resolution sent by the gNB is known as Msg4.

In CFRA, the UE uses a dedicated preamble provided by the network specifically to said UE via RRC signaling or PDCCH order (e.g. Msg0). The RA preamble transmission from the UE to an access node, such as to gNB, is known as Msg1. The gNB then provides the random-access response (RAR) known as Msg2, whose reception completes the procedure. Thus, even though 4-step RA type CFRA procedure does not necessarily comprise fours steps, both CFRA and CBRA procedures are considered the same RA type (i.e. 4-step RA type).

For reducing the latency involved in 4-step RA procedure, a 2-step CBRA procedure has been introduced, shown in FIG. 4. Therein, the RA preamble transmission on the PRACH (MsgA preamble corresponding to Msg1) and PUSCH (MsgA PUSCH corresponding to Msg3) are transmitted together, and this is called MsgA. It is noted that while the Msg A preamble and Msg A PUSCH are indicated in separate steps in FIG. 4, they can be transmitted in one step as well. As a response, UE may receive in so called MsgB an RAR acknowledging only the reception of the preamble (fallback to 4-step procedure) or containing also UE identity for contention resolution.

In 2-step CFRA procedure too, MsgA includes a preamble transmission on PRACH and a payload transmission on PUSCH. The UE then monitors for a response from the network within a configured window. Upon receiving the network response (RAR) known as MsgB, the UE ends the RA procedure or falls back to 4-step procedure depending on the content of MsgB. If the RA procedure with 2-step RA type is not completed after a number of MsgA transmissions, the UE can be configured to switch to CBRA with 4-step RA type.

In 3GPP, the 4-step RA procedure is referred to as 4-step RA type or Type-1 RA procedure and the 2-step RA procedure as 2-step RA type or Type-2 RA procedure.

According to the present 5G NR specifications, the network configures random access resources in a semi-statically manner through a broadcast via system information block (SIB) or using UE-dedicated RRC configuration.

According to the current RACH design, basically all the UEs are following similar RA procedure. However, such RA procedure provides no possibilities for further considerations, for example, regarding the UE mobility status (e.g. high/low mobility or even static), the UE capabilities, the UE QOS requirements (e.g. premium user or ultra low latency users), etc. In addition, there is very little consideration from various deployment points of view. For example, in case with small cell deployment within a factory floor (~50 m), the inaccuracy of the timing advance (TA) might be neglectable. However, this cannot be considered upon the RACH procedure.

Thus, there is a need for a more flexible random access support, especially considering 6G era where more information could be obtained at network side, as well as for a RACH procedure, which leverages the available information to optimize RACH resource configuration with enhanced user experience.

In the following, an enhanced method for a random access procedure will be described in more detail, in accordance with various embodiments.

Figure 5:
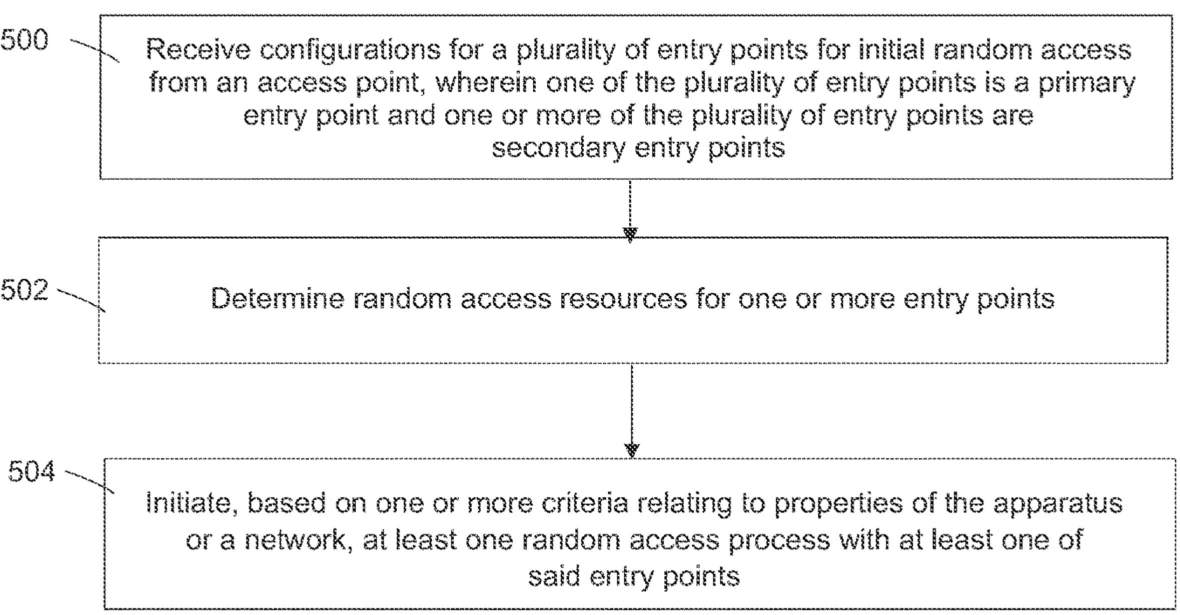
FIG. 5 shows a flow chart for a random access procedure of a user equipment (UE) according to an embodiment.

The method, which is disclosed in flow chart of FIG. 5 as reflecting the operation of a terminal apparatus, such as a user equipment (UE), wherein the method comprises receiving (500) configurations for a plurality of entry points for initial random access from an access point; determining (502) random access resources for one or more entry points; and initiating (504), based on one or more criteria relating to properties of the apparatus or a network, at least one random access process with at least one of said entry points.

Thus, the method enables a UE to access the network via one or multiple random access entry points, wherein the decision about the used entry point(s) can be made based on various criteria, such as depending on the deployment scenario, UE capability/class, knowledge of UE status, etc. The access point, such as the base station (BS), the gNB, or another network element configures multiple entry points to be used by the UE for initial random access.

According to an embodiment, one of the plurality of entry points is a primary entry point and one or more of the plurality of entry points are secondary entry points.

Among the multiple entry points, the access point or another network element configures the random access for a primary entry point, the random access configuration for the primary entry point being referred to herein also as kernel configuration. The kernel configuration may be configured to be activated within one access point or multiple access points. In addition, the access point or another network element configures the random access for one or more secondary entry point(s), the random access configuration(s) for the secondary entry point(s) being referred to herein also as configurations for additional entry point(s).

According to an embodiment, the method comprises receiving the configurations for the plurality of entry points for initial random access in a broadcast message or in a multicast message.

The configured multiple entry points may be transmitted to the UE, for example, via a system information block (SIB) message or, for example in a case where entry points are only accessible to a group of UEs, in a multicast message, such as with group common (GC) downlink control information (DCI) or with other signalling such as RRC signalling.

The UE then determines random access resources for one or more of said multiple entry points. Based on one or more currently applicable criteria, the UE then selects at least one entry point and initiates at least one random access process with said at least one entry point.

According to an embodiment, the method comprises determining random access configuration for the primary entry point from among most reliable available random access resources.

Thus, the random access configuration for the primary entry point (i.e. the kernel configuration) may be determined as a fall-back RA configuration, which is most probably available, even if no other PRACH resources could be accessed. Thus, the kernel configuration may be regarded as a set of fall-back resources to achieve a "fail-safe" operation for initial random access within one cell or across multiple cells. For example, PRACH resource for 4-step RACH can be configured as kernel configuration with a certain amount of resources configured at specific times, in a similar way as the RA configuration for Rel-15 NR.

According to an embodiment, random access configuration for the one or more secondary entry point(s) are determined based on one or more criteria relating to the properties of the apparatus or the network.

There are various scenarios, where pre-configured secondary, i.e. additional, entry points may provide a more flexible and faster procedure for UEs to gain initial access to the network. Potential additional entry points may comprise, for example, one or more of the following:

- High mobility entry point. Herein, to support high speed UEs, for example large subcarrier spacing (SCS) or restricted preamble sets can be applied.
- Low mobility entry point. This may serve as a fall-back entry point with restricted preamble set for high speed UEs (being a typical case in the cell) and as a low mobility entry for UEs that are moving slowly.
- Multi-RAT entry point. This entry point may be used, for example, for supporting multi-RAT spectrum sharing (MRSS) or dynamic spectrum sharing (DSS) or dynamic spectrum access (DSA).
- Known-TA (Timing Advance) entry point. This entry point may be used, for example, in a small cell 5G/6G, providing propagation delay pre-compensation, for example, with the help of location information or other ways.
- Low latency entry point. This entry point may be used, for example, for more frequent RA procedures.
- Massive access entry point. This entry point may be used, for example, for supporting passive type IoT devices.
- High reliable entry point. This entry point may be used, for example, for simultaneous preamble transmission towards multiple TRPs or multiple access points or with long preamble format.
- Advanced RX entry point. This entry point may be used, for example, for machine-learning (ML) based PRACH detection, where the hamming distance among preamble sequences could be smaller.

Figure 6:
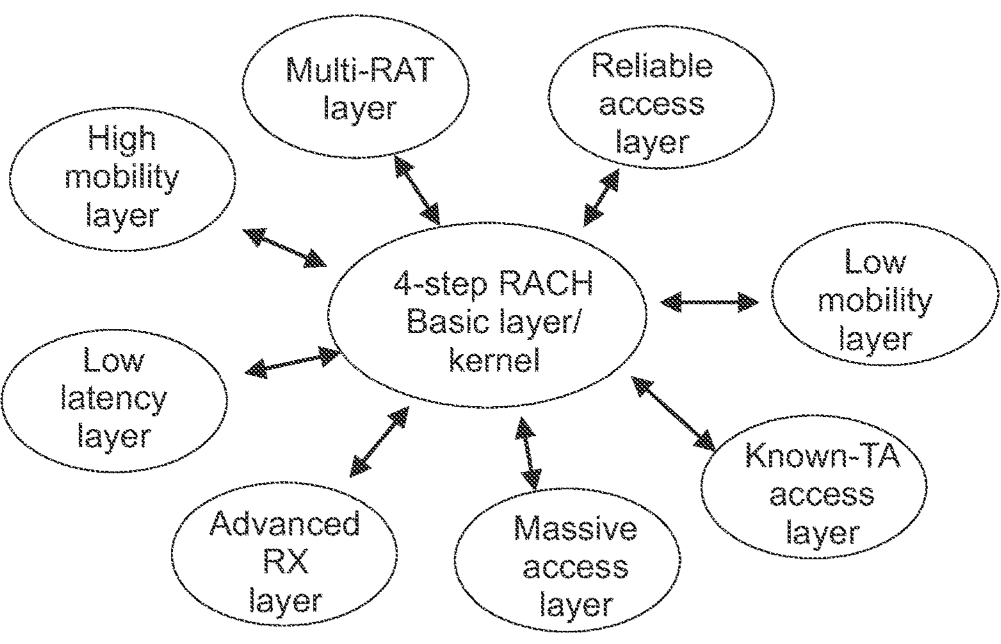
FIG. 6 shows an example of secondary (additional) random access entry points according to an embodiment.

FIG. 6 shows the above additional entry points referred to as additional RA layers gathered around the basic layer, i.e. the kernel configuration, which in the example of FIG. 6 is configured via the 4-step RACH procedure.

It is noted that although there can be several RA entry points, each specified with its specific RACH configuration (in terms of preamble formats, periodicity, etc.), there is no need for one BS to support all the entry points simultaneously. The BS or another network entity/entities may determine which RA entry point(s) are activated. In addition, the multiple entry points can be on the same carrier or different carrier. Moreover, one entry point may be deployed via a terrestrial network, whereas another entry point may be deployed over a non-terrestrial network (NTN). In another example, one entry point may be deployed via public network and another entry point may be deployed via non-public network (NPN).

According to an embodiment, the method comprises receiving an indication about activation or deactivation of at least one secondary entry point.

Thus, after receiving the random access configuration for the one or more secondary entry point(s), the UE needs to know which additional RA entry points are currently activated or supported by the BS or any other access point. For that purpose, a joint or a separate activation/deactivation for each individual entry points may be performed, for example, via a broadcasted message, which is, for example, sent periodically, e.g. every 100 ms. In case the additional entry point is only accessible to a group of UEs, a multicast message can be used as well. A separate or a joint indication about activation or deactivation of certain entry point(s) may also be obtained via e.g. a SIB message, a paging message, a Group common (GC) indication or a Random Access Response (RAR) message.

According to an embodiment, said indication comprises a flag for each configured secondary entry point to indicate the activation or the deactivation.

Thus, a syntax element may be defined for the secondary (additional) RA entry points, where, for example, 8 bits are used to indicate whether each of the additional entries is supported or not. Referring to the types of additional entry points above, bit value "0" may refer to as not supported, whereas the bit values "1" may refer to as supported. The first bit may indicate the support for "high mobility entry point", the second bit for "multi-RAT entry point", etc.

According to an embodiment, the method comprises carrying out only one random access process with only one of said entry points at a time.

Thus, in this option, the UE may carry out only one RA process with only one entry point at one time while respecting the time-wise constraints for the initial access. In other words, the UE may attempt multiple entry points in a time-wise interleaved manner such that the random access procedure for the next entry point is only attempted if no preamble response has been received or contention resolution has failed for the currently attempted entry point.

According to an embodiment, the method comprises carrying out multiple random access processes with one or more of said entry points simultaneously.

Thus, in this option, the UE may carry out multiple RA processes with one or more entry points simultaneously. This may be subjected to the UE capabilities, i.e. whether the UE is able to run parallel RA process over multiple entries. Herein, the unnecessary RA procedures may be terminated based on a mapping between preamble IDs of different entries or a UE indication.

Figure 7:
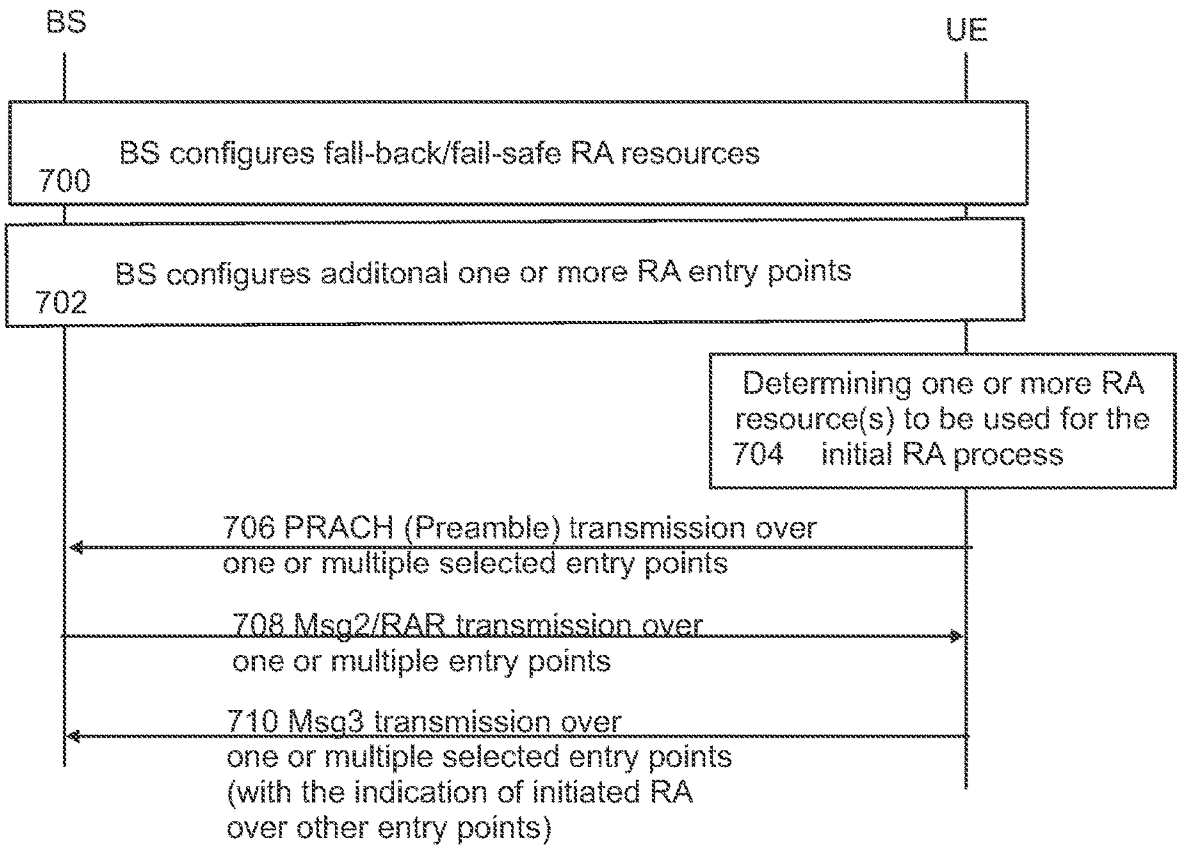
FIG. 7 shows a signalling chart for initial access with multiple RA entry points according to an embodiment.

FIG. 7 shows a signaling diagram example for initial access with multiple RA entry points. The base station (BS) first configures a plurality of entry points for initial random access: a primary entry point, i.e. the kernel configuration, (700) for the fall-back RA resources and one or more secondary (additional) entry points (702). As a part of the process, the RA entry point configurations are signalled to the UE. The UE then determines (704) RA resources for one or more entry points and initiates at least one RA process with at least one of said entry points. In the RA process, the UE sends (706) PRACH resources (preamble(s)) to one or more selected entry points. The BS acknowledges the RA process by sending (708) Msg2 (RARs to the one or more selected entry points) to the UE. The UE then selects at least one entry point, but possibly multiple entry points (if e.g. supported by the UE capability), and indicates (710) the selected one or more entry points in Msg3 transmission to the BS, as well as possible other initiated, but non-selected RA procedures.

As mentioned above, the UE may use various criteria to select the proper entry point(s) for use. The criteria may include, for example, one or more of the following:

- Network configuration: This may provide, either temporarily or permanently, for example only one suitable RA entry at a time.
- UE capability:
  - Multiple entry points possible only if the UE is able to run parallel RA process over multiple entries;
  - Pre-TA compensation;
- Triggers for RA process;
- Device type: e.g. passive IoT type of device;
- Prioritized key performance indicators (KPI): e.g. latency, reliability
- UE status: e.g. UE mobility or static;
- Radio conditions;
- Cell configuration.

In the above criteria, if the UE supports the simultaneous parallel RA processes, then both of the following options are preferably supported by the system: option 1: the UE may carry out the RA process with one entry at one time only, and option 2: the UE may carry out multiple RA processes or have multiple RA entries simultaneously.

As an example, let us assume the BS configuring two RACH configurations, a first configuration for the UEs close to the BS and a second configuration for the UEs close the cell edge. The distance of the UE to the BS may be determined e.g. based on RSRP or some timing with assistance or geolocation information. Herein, the UEs close to the BS may use a short RACH format assuming TA-0, whereas the UEs at cell edge would use a different RACH configuration to obtain TA. The cell provided by the BS may be, for example, an indoor cell in a factory whose coverage leaks out of the factory. The UE close to the BS may determine that it is beneficial to use both RACH configurations simultaneously, if needed, e.g. due to moving inside and outside the factory.

Figure 8:
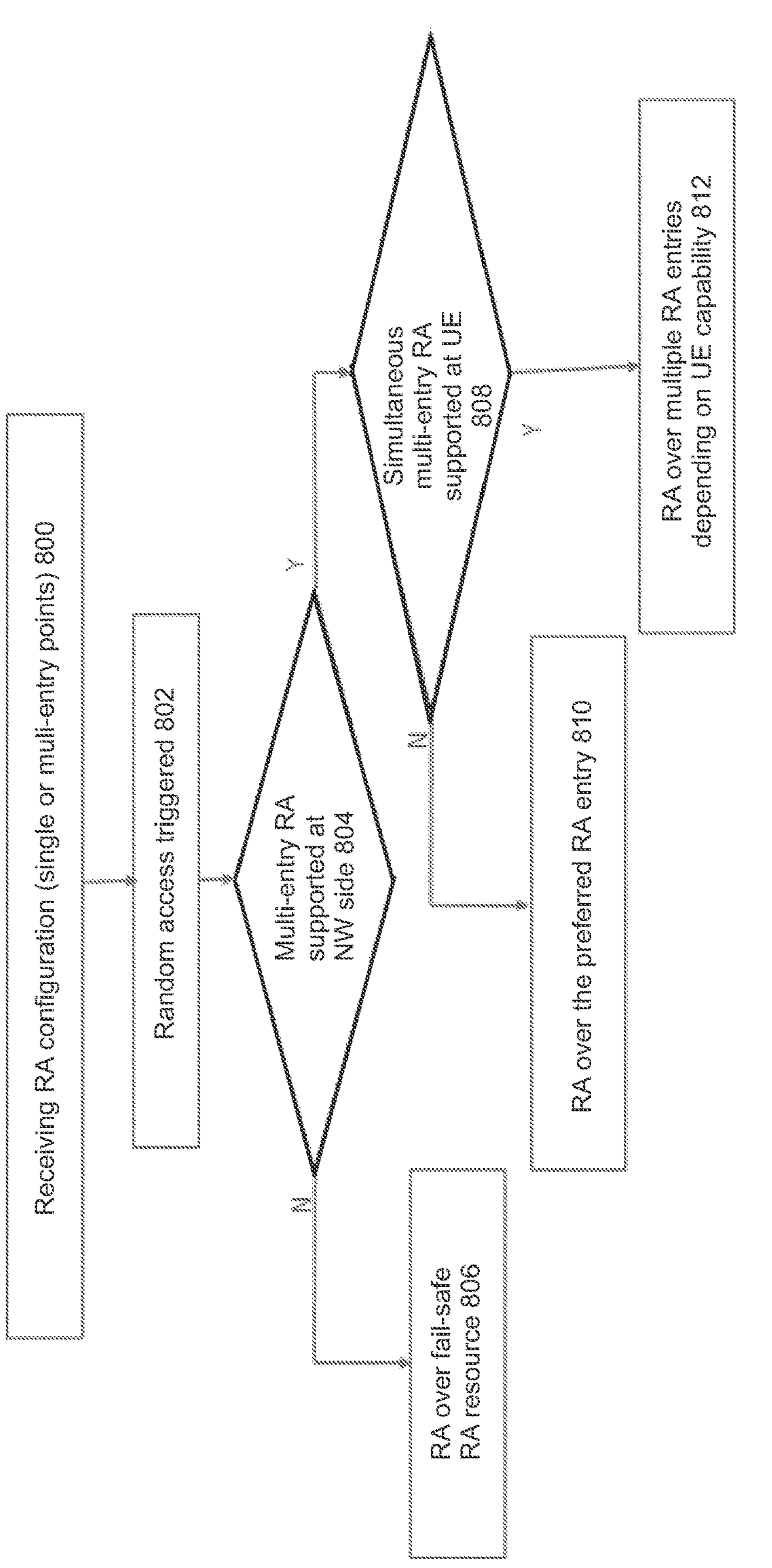
FIG. 8 shows an exemplified flow chart for the UE to select the one or more entry points for random access according to an embodiment.

FIG. 8 shows an exemplified flow chart for the UE to select the one or more entry points for random access. The UE receives (800) the RA configuration(s) for one or more entry points, and triggers (802) a random access process. It is first checked (804), if the network supports the multiple entry point random access processes at all. If not, then there is only the primary entry point available and the RA process is initiated (806) with the primary entry point providing the fail-safe RA resource.

If the network supports the multiple entry point random access processes, it is next checked (808), if the UE supports the multiple entry point random access processes simultaneously. If not, the UE selects a preferred entry point among the primary entry point and the one or more secondary entry points, and the RA process is initiated (810) with the preferred entry point. Alternatively, the preferred entry point may be configured by the network beforehand. If the network supports the multiple entry point random access processes simultaneously, then depending on the UE capability, one or multiple RA processes may be initiated (812) with one or more preferred entry point(s).

Considering the scenario where the UE starts multiple procedures for different RA entries, early termination of unnecessary RA processes would be beneficial, for example, to avoid useless UL scheduling for Msg3 transmissions or retransmissions. The termination may take place, for example, based on the BS determining that the multiple preambles are likely coming from the same UE, because the direction of arrivals, propagation delays and radio channels seem to match. Determination of multiple entries becomes more reliable, if there is a mapping between the preamble IDs of the multiple entries. The termination may also be assisted by the UE. Therein, the UE may indicate in a Msg3 that it has tried multiple entries. The indication may be made by a single bit, if there is a mapping between the preamble IDs of the entries.

Figure 9:
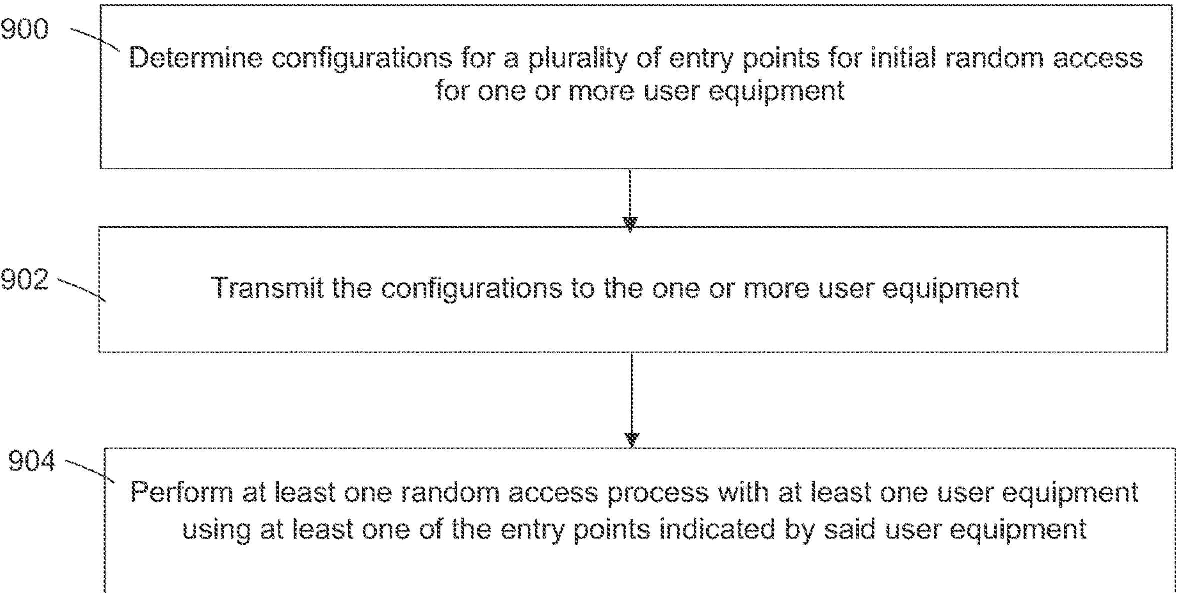
FIG. 9 shows a flow chart for a random access procedure of an access point according to an embodiment.

Another aspect relates to operation of an access point, such as the BS. The access point carries out a complementary operation for the UE and may thus perform a method disclosed in the flow chart of FIG. 9, the method comprising determining (900) configurations for a plurality of entry points for initial random access for one or more user equipment; transmitting (902) the configurations to the one or more user equipment; and performing (904) at least one random access process with at least one user equipment using at least one of said entry points indicated by said user equipment.

Accordingly, the access point, such as the BS, determines the plurality of entry points for initial random access for at least one UE. The RA entry point configurations are signalled to the UE. The UE determines RA resources for one or more entry points and initiates at least one RA process with at least one of said entry points, for example, by sending PRACH resources (preamble(s)) to one or more selected entry points. This serves as the trigger for the access point to start to perform a RA process with the UE using said one or more entry points selected by the UE.

The methods and the related embodiments may provide various advantages. The methods and the related embodiments enable a UE to access the network via one or multiple random access entry points over the same cell/carrier or even over different carriers/cells, naturally depending the UE capability and prevailing network conditions and parameters. Additionally, a more robust RA procedure is achieved especially considering the introduction of kernel configuration. Moreover, the method provides improved support for high priority UEs/UE groups.

An apparatus, such as a UE, according to an aspect comprises means for receiving configurations for a plurality of entry points for initial random access from an access point; means for determining random access resources for one or more entry points; and means for initiating, based on one or more criteria relating to properties of the apparatus or a network, at least one random access process with at least one of said entry points.

According to an embodiment, one of the plurality of entry points is a primary entry point and one or more of the plurality of entry points are secondary entry points.

According to an embodiment, random access configuration for the primary entry point is determined from among most reliable available random access resources.

According to an embodiment, random access configuration for the one or more secondary entry points are determined based on one or more criteria relating to the properties of the apparatus or the network.

According to an embodiment, the apparatus comprises means for receiving the configurations for the plurality of entry points for initial random access in a broadcast message or in a multicast message.

According to an embodiment, the apparatus comprises means for receiving an indication about activation or deactivation of at least one secondary entry point.

According to an embodiment, said indication comprises a flag for each configured secondary entry point to indicate the activation or the deactivation.

According to an embodiment, the apparatus comprises means for carrying out only one random access process with only one of said entry points at a time.

According to an embodiment, the apparatus comprises means for carrying out multiple random access processes with one or more of said entry points simultaneously.

An apparatus according to a further aspect comprises at least one processor and at least one memory, said at least one memory stored with computer program code thereon, the at least one memory and the computer program code configured to, with the at least one processor, cause the apparatus at least to perform: receive configurations for a plurality of entry points for initial random access from an access point; determine random access resources for one or more entry points; and initiate, based on one or more criteria relating to properties of the apparatus or a network, at least one random access process with at least one of said entry points.

According to an embodiment, one of the plurality of entry points is a primary entry point and one or more of the plurality of entry points are secondary entry points.

According to an embodiment, random access configuration for the primary entry point is determined from among most reliable available random access resources.

According to an embodiment, random access configuration for the one or more secondary entry points are determined based on one or more criteria relating to the properties of the apparatus or the network.

According to an embodiment, the apparatus comprises code configured to cause the apparatus to receive the configurations for the plurality of entry points for initial random access in a broadcast message or in a multicast message.

According to an embodiment, the apparatus comprises code configured to cause the apparatus to receive an indication about activation or deactivation of at least one secondary entry point.

According to an embodiment, said indication comprises a flag for each configured secondary entry point to indicate the activation or the deactivation.

According to an embodiment, the apparatus comprises code configured to cause the apparatus to carry out only one random access process with only one of said entry points at a time.

According to an embodiment, the apparatus comprises code configured to cause the apparatus to carry out multiple random access processes with one or more of said entry points simultaneously.

A further aspect relates to a computer program product, stored on a non-transitory memory medium, comprising computer program code, which when executed by at least one processor, causes an apparatus at least to perform: receive configurations for a plurality of entry points for initial random access from an access point; determine random access resources for one or more entry points; and initiate, based on one or more criteria relating to properties of the apparatus or a network, at least one random access process with at least one of said entry points.

A yet another aspects relates to an apparatus operating as a network element, such as an access point, for example a BS, wherein the apparatus comprises means for determining configurations for a plurality of entry points for initial random access for one or more user equipment; means for transmitting the configurations to the one or more user equipment; and means for performing at least one random access process with at least one user equipment using at least one of said entry points indicated by said user equipment.

According to an embodiment, one of the plurality of entry points is a primary entry point and one or more of the plurality of entry points are secondary entry points.

According to an embodiment, random access configuration for the primary entry point is determined from among most reliable available random access resources.

According to an embodiment, the apparatus comprises means for determining random access configuration for the one or more secondary entry points based on one or more criteria relating to the properties of the user equipment or a network.

The apparatus may also be implemented as comprising at least one processor and at least one memory, said at least one memory stored with computer program code thereon, the at least one memory and the computer program code configured to, with the at least one processor, cause the apparatus at least to perform: determine configurations for a plurality of entry points for initial random access for one or more user equipment; transmit the configurations to the one or more user equipment; and perform at least one random access process with at least one user equipment using at least one of said entry points indicated by said user equipment.

According to an embodiment, one of the plurality of entry points is a primary entry point and one or more of the plurality of entry points are secondary entry points.

According to an embodiment, random access configuration for the primary entry point is determined from among most reliable available random access resources.

According to an embodiment, the apparatus comprises code configured to cause the apparatus to determine random access configuration for the one or more secondary entry points based on one or more criteria relating to the properties of the user equipment or a network.

A further aspect relates to a computer program product, stored on a non-transitory memory medium, comprising computer program code, which when executed by at least one processor, causes an apparatus at least to perform: determine configurations for a plurality of entry points for initial random access for one or more user equipment; transmit the configurations to the one or more user equipment; and perform at least one random access process with at least one user equipment using at least one of said entry points indicated by said user equipment.

Such apparatuses may comprise e.g. the functional units disclosed in any of the FIGS. 1-3 for implementing the embodiments.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. A user equipment (UE) apparatus comprising:

at least one processor; and at least one memory, said at least one memory stored with computer program code thereon, the at least one memory and the computer program code configured to, with the at least one processor, cause the UE apparatus at least to:

receive configurations for a plurality of entry points for initial random access from an access point, each entry point including a random access configuration, wherein each entry point of the plurality of entry points corresponds to a random access configuration distinct from cell identity;

determine random access resources for one or more entry points supported by the access point;

initiate, based on one or more criteria relating to properties of the apparatus or a network, at least one random access process with at least one of said entry points of the access point, wherein one of the plurality of entry points is a primary entry point and one or more of the plurality of entry points are secondary entry points, the primary entry point corresponding to a fall-back configuration supported by multiple cells, wherein random access configuration for the primary entry point is determined from among available random access resources configured as a fall-back configuration for initial access, wherein random access configuration for the one or more secondary entry points are determined based on one or more criteria relating to the properties of the apparatus or the network, wherein the criteria includes:

network configuration: providing temporarily or permanently, only one suitable random access (RA) entry at a time;

UE capability including:

multiple entry points possible where the UE is configured to run parallel RA processes over multiple entries; and pre-timing advance (TA) compensation;

triggers for RA process;

device type, including passive IoT type of device;

prioritized key performance indicators (KPI), including latency and reliability;

UE status, including UE mobility or static;

radio conditions; and cell configuration; and transmit the determined random access resources to one or more selected entry points;

receive the configurations for the plurality of entry points for initial random access in a broadcast message or in a multicast message;

receive an indication about activation or deactivation of at least one secondary entry point, wherein the indication comprises a flag for each configured secondary entry point to indicate the activation or the deactivation.

* * * * *